United States Patent [19]

Nishimura

[11] Patent Number: 4,539,343
[45] Date of Patent: Sep. 3, 1985

[54] REFRACTORY MATERIAL

[75] Inventor: Toshiaki Nishimura, Fujieda, Japan

[73] Assignee: Sumitomo Durez Company, Ltd., Tokyo, Japan

[21] Appl. No.: 590,927

[22] Filed: Mar. 19, 1984

[30] Foreign Application Priority Data

Mar. 25, 1983 [JP] Japan ................................. 58-49014

[51] Int. Cl.$^3$ ........................... C08K 3/22; C08K 3/38; C08L 61/06; C21B 7/06
[52] U.S. Cl. .................................... 523/145; 523/146; 524/158; 524/291; 524/405; 524/375; 524/321; 524/433; 524/594
[58] Field of Search ............... 523/139, 140, 141, 145, 523/146; 524/375, 405, 158, 594, 433, 291, 321

[56] References Cited

U.S. PATENT DOCUMENTS

| | | | |
|---|---|---|---|
| 2,682,692 | 7/1954 | Kohl | 524/405 |
| 2,748,101 | 5/1956 | Shappell | 524/405 |
| 2,864,782 | 12/1958 | Mitchell | 524/405 |
| 4,116,916 | 9/1978 | Holik | 524/375 |
| 4,183,759 | 1/1980 | Epstein | 523/149 |
| 4,195,458 | 4/1980 | Hoppe | 523/141 |
| 4,212,778 | 7/1980 | Bakker | 523/141 |
| 4,426,484 | 1/1984 | Saeki | 523/145 |
| 4,427,800 | 1/1984 | Nakamura | 523/139 |

FOREIGN PATENT DOCUMENTS 0118074 7/1982 Japan ................................... 523/145

*Primary Examiner*—C. Warren Ivy
*Attorney, Agent, or Firm*—J. F. Tao; J. F. Mudd

[57] ABSTRACT

A refractory composition or mixture utilizing basic aggregates is disclosed which does not discolor when a phenolic binder is used, and provides improved flexural strength. The composition contains specific proportions of phenolic resin and a compound having a pKa of less than 9.5 at 25° C. and basic aggregates.

9 Claims, No Drawings

REFRACTORY MATERIAL

BACKGROUND OF THE INVENTION

This invention relates to a refractory composition employing basic aggregates consisting primarily of magnesium and calcium oxides, phenolic resin and an acid compound having a pKa less than 9.5 at 25° C.

Refractory aggregates are mixed with the resin and pressed or molded into the desired shape or structure, and the resin polymerizes to form a refractory, which may be subjected to further heat treatment to prepare the final refractory item. During the heating and processing cycles, the resin must maintain the refractory materials in the desired shape until the aggregates unite to form the final refractory. During this cycle, the temperatures may be such that the resin is destroyed and removed from the final refractory.

Materials such as tar and pitch have been used as binders for refractory aggregates but these materials were difficult to work with and could not be used for molding complex or intricate parts. Phenolic resins have generally replaced tars, pitches etc. and have provided processes that can be conducted at ambient temperatures and have reduced the environmental problems associated with refractory production. The use of phenolic resins has enabled the mass production of complex structured refractory materials.

It is known that a refractory composition made of basic aggregate and a phenolic resin colors to a reddish violet hue. When molded and fired, such a refractory material does not provide refractories which have satisfactory flexural strength. The coloring of reddish violet and the low flexural strength of refractories are pronounced when the refractory material is produced by wet process in which the mixing of refractory materials is accomplished in the form of water slurry. The flexural strength of refractories may be improved if phenolic resin binder is added in large quantities during the production of the refractory material. This leads to the cost increase of the refractory material, and excessive phenolic resin in the refractories generates a large quantity of hydrogen gas on decomposition which takes place when the refractories come into contact with molten metal. This hydrogen enters the molten metal and stays in the free form in cast iron, causing cold brittle fracture of cast iron. Phenolic resin is used as a binder for refractory materials on account of its merits; but phenolic resin has the above-mentioned disadvantages.

In order to overcome these disadvantages, the present inventors carried out a series of investigations which have led to the findings that a refractory material containing a compound having a pKa lower than 9.5 at 25° C. and a phenolic resin in a specific ratio is free of the above-mentioned disadvantages.

pKa is the dissociation constant of acids. In the case of acids that undergo dissociation in multiple stages, pKa is the dissociation constant of the first stage.

The invention, disclosed herein produces a refractory that does not color to a reddish violet hue and provides refractions having improved flexural strength.

SUMMARY OF THE INVENTION

The present invention refers to a refractory material or composition wherein a basic aggregate is mixed with a phenolic resin and a compound having a pKa of less than 9.5 at 25° C., to produce refractories that do not discolor to reddish violet shades and have improved flexural strength.

The refractory material, disclosed herein, contains up to 750 parts by weight, preferably 150 to 750 parts by weight, of phenolic resin and up to 230 parts by weight, preferably 2 to 230 parts by weight, of a compound having a pKa lower than 9.5 at 25° C., based on 5000 parts of basic aggregate. The phenolic resin can be selected from novolac or solid resole type phenolic resins, and may be modified with small amounts of methoxymethylphenyl ether to improve the plasticizing of the phenolic resin, improving the wetting characteristics of the resin, and the strength of the final refractory.

DETAILED DESCRIPTION OF THE INVENTION

The present invention relates to a refractory material based on basic aggregate formed by a phenolic resin binder.

It is known that a refractory material or composition made of basic aggregates and a phenolic resin colors to reddish violet. When molded and fired, such a refractory material does not provide refractories which have satisfactory flexural strength. The coloring to reddish violet and the low flexural strength of refractories are pronounced when the refractory material is produced by wet process in which the mixing of refractory materials is accomplished in the form of water slurry. The flexural strength of refractories may be improved if phenolic resin as a binder is added in large quantities during the production of the refractory material. This leads to the cost increase of the refractory material, and excessive phenolic resin in the refractories generates a large quantity of hydrogen gas on decomposition which takes place when the refractories come into contact with molten metal. This hydrogen enters the molten metal and stays in the free form in cast iron, causing cold brittle fracture of cast iron. Phenolic resin is used as a binder for refractory materials on account of its merits; but phenolic resin has the above-mentioned disadvantages.

In order to overcome these disadvantages, the present inventors carried out a series of investigations, which led to the findings that a refractory material containing a compound having a pKa lower than 9.5 at 25° C. and a phenolic resin in a specific ratio is free of the above-mentioned disadvantages. (pKa is the dissociation constant of acids. In the case of acids that undergo dissociation in multiple stages, pKa is the dissociation constant of the first stage.) In other words, a refractory material which contains up to 750 parts by weight, preferably 150 to 750 parts by weight, of phenolic resin and up to 230 parts by weight, preferably 2 to 230 parts by weight, of a compound having a pKa lower than 9.5 at 25° C., based on 5000 parts of basic aggregate, does not color in reddish violet and yet provides refractories having sufficient flexural strength.

In the conventional case, it is considered that CaO and MgO in basic aggregate react with hydroxyl groups in phenolic resin, forming a metal salt of the phenolic resin. A compound having a pKa lower than 9.5 at 25° C. dissociates more easily than the hydroxyl groups in phenolic resin. Therefore, dissociation of such a compound proceeds further when it is present with a phenolic resin. As the result, the dissociation of the hydroxyl groups in the phenolic resin decreases accordingly. Thus, it is considered that when a compound having a pKa lower than 9.5 at 25° C. is present in a certain amount, it prevents the dissociated ions of CaO and MgO from bonding to the hydroxyl groups in phenolic resin.

The intended effect was not produced with an acid having a pKa higher than 9.5 at 25° C. The compound having a pKa lower than 9.5 at 25° C. should preferably be a solid at normal temperature, because it is easier to handle for weighing, transportation, etc.

Such a compound is usually an acid selected from organic acids and inorganic acids. Examples of such acids include organic carboxylic acids such as salicylic acid, maleic acid, fumaric acid, oxalic acid, benzoic acid, and malonic acid; organic sulfonic acid such as xylenesulfonic acid, toluenesulfonic acid, and phenolsulfonic acid; and inorganic acids such as boric acid and phosphoric anhydride.

The compound having a pKa lower than 9.5 at 25° C. may be previously added to the phenolic resin, or incorporated before, during, or after mixing with other refractory materials. In the case where it is incorporated after other refractory materials have been mixed, it should be added at the time when CaO and MgO have not yet dissociated due to contact with water. Therefore, it is recommended that this compound be added before or during the mixing of other refractory materials.

This invention is preferably practiced if the phenolic resin is incorporated with methoxymethylphenyl ether. Methoxymethylphenyl ether may be added to the phenolic resin at any time before, during, or after the reaction of the phenolic resin. Methoxymethylphenyl ether has a characteristic odor and therefore can be easily detected in the practice of this invention. Methoxymethylphenyl ether incorporated into the phenolic resin decomposes on contact with an acid. The decomposition product readily bonds to free phenol in the phenolic resin. This increases the strength of fired refractories. Methoxymethylphenyl ether has, on the other hand, the effect of plasticizing the phenolic resin, which improves the wetting of phenolic resin to the aggregate. As the result, the strength of the fired refractories is more improved than that which contains no methoxymethylphenyl ether. The content of methoxymethylphenyl ether should be less than 10 parts by weight based on 100 parts by weight of phenolic resin. If the content is higher than this limit, excessive methoxymethylphenyl ether decomposes during firing, giving off volatile matters which form voids in the fired refractories, decreasing the strength of the refractories. Moreover, excessive methoxymethylphenyl ether lowers the melting point of the phenolic resin which is solid at normal temperature, causing the phenolic resin to harden during storage.

The refractory material of this invention may be incorporated with inorganic fiber and other substances having a good filling effect. In such a case, phenolic resin as a binder may be added in an amount proportional to such substances.

The refractory material of this invention can be produced by dry blending or mixing in the form of water slurry. The latter method is preferred.

The invention is now described in more detail with reference to the following nonlimitative examples, in which "parts" and "%" mean "parts by weight" and "wt %", respectively, unless otherwise indicated.

EXAMPLE 1

Into a reactor equipped with a stirrer, reflux condenser, and thermometer were charged 1940 parts of phenol, 80 parts of methoxymethylphenyl ether, 1380 parts of 37% formalin, and 6 parts of 35% hydrochloric acid. Reaction was carried out at 98° to 103° C. for 3 hours. Dehydration was carried out under reduced pressure of 30 to 50 mmHg until the liquid temperature reached 150° C. The reaction product was discharged. Thus, there was obtained 2030 parts of phenolic resin containing 76 parts of methoxymethylphenyl ether and having a melting point of 83° C. 200 parts of this phenolic resin, 10 parts of hexamethylenetetramine, and 10 parts of boric acid were crushed using a laboratory crusher. Thus, there was obtained 204 parts of powdery resin composition.

120 parts of the powdery resin composition, 2000 parts of magnesia clinker (MgO 90%, CaO 8%, others 2%, particles smaller than 105 microns: 90%), and 2000 parts of tap water were mixed for 10 minutes in a 5-liter Shinagawa-type mixer. Thus, there was obtained 4050 parts of refractory material in the form of slurry.

EXAMPLE 2

Into a reactor equipped with a stirrer, reflux condenser, and thermometer were charged 2000 parts of phenol, 1380 parts of 37% formalin, and 6 parts of 35% hydrochloric acid. Reaction was carried out at 98° to 103° C. for 3 hours. Dehydration was carried out under reduced pressure of 30 to 50 mmHg until the liquid temperature reached 150° C. The reaction product was discharged. Thus, there was obtained 2050 parts of phenolic resin having a melting point of 88° C. 200 parts of this phenolic resin, 10 parts of hexamethylenetetramine, and 20 parts of maleic acid were crushed by using a laboratory crusher Thus, there was obtained 210 parts of powdery resin composition.

120 parts of the powdery resin composition, 2000 parts of magnesia clinker (MgO 90%, CaO 8%, others 2%, particles smaller than 105 microns: 70%), and 2000 parts of tap water were mixed for 10 minutes in a 5-liter Shinagawa-type mixer. Thus, there was obtained 4050 parts of refractory material in the form of slurry.

EXAMPLE 3

Into a reactor equipped with a stirrer, reflux condenser, and thermometer were charged 1316 parts of phenol, 2174 parts of 37% formalin, 42 parts of 25% ammonia water, and 28 parts of potassium hydroxide. Reaction was carried out at 90° C. for 60 minutes. Dehydration was carried out while heating at 130° C. under reduced pressure of 40 to 70 mmHg until the liquid temperature reached 110° C. When the product temperature reached 110° C., heating was stopped and the reaction was continued under adiabatic conditions. When the product temperature reached 120° C., the product was discharged and cooled rapidly. Thus, there was obtained 1410 parts of solid resol type phenolic resin having a melting point of 72° C. 200 parts of this phenolic resin and 40 parts of salicylic acid were crushed by using a laboratory crusher. Thus, there was obtained 225 parts of powdery resin composition.

120 parts of the powdery resin composition, 2000 parts of magnesia clinker (MgO 90%, CaO 8%, others 2%, particles smaller than 105 microns: 70%), and 2000 parts of tap water were mixed for 10 minutes in a 5-liter Shinagawa-type mixer. Thus, there was obtained 4060 parts of refractory material in the form of slurry.

EXAMPLE 4

120 parts of the phenolic resin obtained in Example 2, 80 parts of solid resol type phenolic resin obtained in Example 3, 5 parts of hexamethylenetetramine, and 10 parts of boric acid were crushed by using a laboratory crusher. Thus, there was obtained 205 parts of powdery resin composition.

120 parts of the powdery resin composition, 2000 parts of magnesia clinker (MgO 90%, CaO 8%, others 2%, particles smaller than 105 microns: 70%), and 2000 parts of tap water were mixed for 10 minutes in a 5-liter Shinagawa-type mixer. Thus, there was obtained 4040 parts of refractory material in the form of slurry.

EXAMPLE 5

Into a reactor equipped with a stirrer, reflux condenser, and thermometer were charged 2000 parts of phenol, 1380 parts of 37% formalin, and 6 parts of 35% hydrochloric acid. Reaction was carried out at 98° to 103° C. for 3 hours.

Dehydration was carried out under reduced pressure of 30 to 50 mmHg until the product temperature reached 130° C. At this temperature, 100 parts of boric acid was added. Dehydration was carried out again under reduced pressure of 30 to 50 mmHg until the product temperature reached 150° C. Thus, there was obtained 2120 parts of phenolic resin containing 99 parts of boric acid and having a melting point of 93° C. 200 parts of this phenolic resin and 10 parts of hexamethylenetetramine were crushed by using a laboratory crusher. Thus, there was obtained 200 parts of powdery resin composition.

150 parts of the powdery resin composition, 2000 parts of magnesia clinker (MgO 90%, CaO 8%, others 2%, particles smaller than 105 microns: 70%), 300 parts of slag wool, 6 parts of xylenesulfonic acid, and 2000 parts of tap water were mixed for 10 minutes in a 5-liter Shinagawa-type mixer, Thus, there was obtained 4380 parts of refractory material in the form of slurry.

EXAMPLE 6

200 parts of the phenolic resin containing methoxymethylphenyl ether as obtained in Example 1, and 10 parts of hexamethylenetetramine were crushed by using a laboratory crusher. Thus, there was obtained 206 parts of powdery resin composition.

120 parts of the powdery resin composition, 2000 parts of magnesia clinker (Mg) 90%, CaO 8%, others 2%, particles smaller than 105 microns: 70%), 30 parts of boric acid, and 2000 parts of tap water were mixed for 10 minutes in a 5-liter Shinagawa-type mixer. Thus, there was obtained 4100 parts of refractory material in the form of slurry.

EXAMPLE 7

200 parts of the phenolic resin obtained in Example 2 and 10 parts of hexamethylenetetramine were crushed by using a laboratory crusher. Thus, there was obtained 203 parts of powdery resin composition.

120 parts of the powdery resin composition, 2000 parts of magnesia clinker (MgO 90%, CaO 8%, others 2%, particles smaller than 105 microns: 70%), 5 parts of phenolsulfonic acid, and 2000 parts of tap water were mixed for 10 minutes in a 5-liter Shinagawa-type mixer. Thus, there was obtained 4100 parts of refractory material in the form of slurry.

EXAMPLE 8

Into a reactor equipped with a stirrer, reflux condenser, and thermometer were charged 1316 parts of phenol, 30 parts of methoxymethylphenyl ether, 2174 parts of 37% formalin, 42 parts of 25% ammonia, and 28 parts of potassium hydroxide. Reaction was carried out at 90° C. for 60 minutes.

While heating the reactor at 130° C., dehydration was carried out under reduced pressure of 40 to 70 mmHg until the product temperature reached 110° C. At this temperature, heating was stopped and reaction was continued under adiabatic condition. When the product temperature reached 120° C., the reaction product was discharged and cooled rapidly. Thus, there was obtained 1380 parts of resol type phenolic resin containing 46 parts of methoxymethylphenyl ether and having a melting point of 70° C. 200 parts of this phenolic resin was crushed by using a laboratory crusher. Thus, there was obtained 200 parts of powdery resin composition.

120 parts of the powdery resin composition, 2000 parts of magnesia clinker (MgO 90%, CaO 8%, others 2%, particles smaller than 105 microns: 70%), 20 parts of boric acid, and 2000 parts of tap water were mixed for 10 minutes in a 5-liter Shingawa-type mixer. Thus, there was obtained 4080 parts of refractory material in the form of slurry.

EXAMPLE 9

120 parts of the phenolic resin containing methoxymethylphenyl ether as obtained in Example 1, 80 parts of solid resol type phenolic resin containing methoxymethylphenyl ether as obtained in Example 8, and 3 parts of hexamethylenetetramine were crushed by using a laboratory crusher. Thus, there was obtained 200 parts of powdery resin composition.

120 parts of the powdery resin composition, 2000 parts of magnesia clinker (MgO 90%, CaO 8%, others 2%, particles smaller than 105 microns: 70%), 8 parts of boric acid, and 2000 parts of tap water were mixed for 10 minutes in a 5-liter Shinagawa-type mixer. Thus, there was obtained 4080 parts of refractory material in the form of slurry.

COMPARATIVE EXAMPLE 1

200 parts of the phenolic resin obtained in Example 2 and 10 parts of hexamethylenetetramine were crushed by using a laboratory crusher. Thus, there was obtained 205 parts of powdery resin composition. 120 parts of this powdery resin composition was mixed with aggregate in the same manner as in Example 2. Thus, there was obtained 4080 parts of refractory material in the form of slurry.

COMPARATIVE EXAMPLE 2

220 parts of the solid resol type phenolic resin obtained in Example 3 was crushed by using a laboratory crusher. Thus, there was obtained 216 parts of powdery resol type phenolic resin. 120 parts of this powdery resol type phenolic resin was mixed with aggregate in the same manner as in Example 3. Thus, there was obtained 4050 parts of refractory material in the form of slurry.

COMPARATIVE EXAMPLE 3

120 parts of the phenolic resin obtained in Example 2, 80 parts of solid resol type phenolic resin obtained in Example 3, and 5 parts of hexamethylenetetramine was crushed by using a laboratory crusher. Thus, there was obtained 200 parts of powdery resin composition. 120 parts of this powdery resin composition was mixed with aggregate in the same manner as in Example 4. Thus, there was obtained 4010 parts of refractory material in the form of slurry.

APPLICATION EXAMPLE

Each of the refractory materials obtained in Examples 1 to 9 and Comparative Examples 1 to 3 was made into test pieces of refractories. The test pieces were prepared in two steps of molding and firing. 1200 parts of the refractory material was placed in a separable frame, 20 cm wide, 15 cm long, and 1 cm high, and water was removed over 5 minutes under reduced pressure of 650 to 700 mmHg. Excess refractory material standing up from the frame was scraped off with a metal spatula and the top was made smooth. The frame was turned up side down, with a steel plate placed on the top. After removal of the frame, the molded specimen was on the steel plate. Three specimens were prepared from each refractory material. The specimens were placed in a firing furnace (hot air circulating type) after standing for 3 hours and 24 hours. The furnace temperature was kept at 100° C. for 1 hour and then raised to 170° C. at which firing was carried out for 4 hours.

Table 1 shows the color of the molded specimens prior to firing and uneven coloring of the specimens after firing.

TABLE 1

| Time of standing after molding (hrs.) | Coloring of molded specimen | | | Uneven coloring of refractories | | |
|---|---|---|---|---|---|---|
| | 0 | 3 | 24 | 0 | 3 | 24 |
| Example 1 | G | G | G | G | G | G |
| Example 2 | G | G | F | G | G | F |
| Example 3 | G | G | F | G | G | F |
| Example 4 | G | G | G | G | G | G |
| Example 5 | G | G | G | G | G | G |
| Example 6 | G | G | G | G | G | G |
| Example 7 | G | G | F | G | G | F |
| Example 8 | G | G | G | G | G | G |
| Example 9 | G | G | G | G | G | G |
| Comparative Example 1 | F | P | P | F | P | P |
| Comparative Example 2 | G | P | P | G | P | P |
| Comparative Example 3 | G | P | P | G | P | P |

Rating of coloring:
G (Good): No coloration
F (Fair): Slight coloring (pink)
P (Poor): Severe coloring (reddish violet)
Rating of uneven coloring of refractories:
G (Good): Even in color
F (Fair): Slightly uneven in color
P (Poor): Severely uneven in color Table 1 indicates that the refractory materials obtained in Examples 1 to 9 are better than those obtained in Comparative Examples 1 to 3 in the discoloration that takes place during standing after molding and uneven coloring in fired refractories.

The specimens of the refractories were cut to length for measurement of flexural strength and apparent density. The results are shown in Table 2.

TABLE 2

| Time of standing after molding (hrs.) | Flexural strength | | | Apparent density | | |
|---|---|---|---|---|---|---|
| | 0 | 3 | 24 | 0 | 3 | 24 |
| Example 1 | 99 | 96 | 90 | 2.18 | 2.18 | 2.18 |
| Example 2 | 94 | 90 | 86 | 2.18 | 2.18 | 2.17 |
| Example 3 | 84 | 82 | 80 | 2.18 | 2.19 | 2.18 |
| Example 4 | 92 | 90 | 86 | 2.19 | 2.18 | 2.18 |
| Example 5 | 92 | 89 | 83 | 1.90 | 1.91 | 1.90 |
| Example 6 | 103 | 101 | 96 | 2.18 | 2.18 | 2.18 |
| Example 7 | 96 | 93 | 90 | 2.18 | 2.17 | 2.18 |
| Example 8 | 86 | 84 | 82 | 2.17 | 2.18 | 2.18 |
| Example 9 | 93 | 92 | 88 | 2.18 | 2.18 | 2.18 |
| Comparative Example 1 | 76 | 69 | 54 | 2.18 | 2.17 | 2.18 |
| Comparative Example 2 | 70 | 65 | 58 | 2.17 | 2.18 | 2.18 |
| Comparative Example 3 | 72 | 68 | 60 | 2.18 | 2.18 | 2.17 |

Note 1:
Dimensions of specimen:
20 cm long, 2 cm wide, and 1 cm thick.
Note 2:
Flexural strength (kg/cm$^2$):
Measured by a Tensilon type flextural tester; span 15 cm; loading speed 2 mm/min; failure load.
Note 3:
Apparent density:
Calculated from the weight and volume of specimen.

Table 2 indicates that the refractories produced from the refractory materials obtained in Examples 1 to 9 are better than those obtained in Comparative Examples 1 to 3 in flexural strength and the decrease of strength that takes place during standing after molding.

We claim:

1. A refractory composition consisting essentially of basic refractory aggregates consisting primarily of magnesium oxides, calcium oxides and mixtures thereof, phenolic resin, hexamethylene tetramine and a compound having a pKa less than 9.5 at 25° C., said phenolic resin is added to 5000 parts by weight of aggregate in an amount from about 150 to about 750 parts by weight and said compound from about 2 to about 230 parts by weight.

2. A refractory composition according to claim 1, wherein the phenolic resin is a novolac phenolic resin.

3. A refractory composition according to claim 1, wherein the phenolic resin is a solid resole phenolic resin.

4. A refractory composition according to claim 1, wherein the phenolic resin is a mixture of novolac phenolic resin and solid resol phenolic resin.

5. A refractory composition according to claim 1, wherein the phenolic resin has incorporated therein methoxymethylphenyl ether in the amount from about 0.1 to about 10 parts by weight methoxymethylphenyl ether per 100 parts by weight phenolic resin.

6. A refractory composition according to claim 2, wherein the phenolic resin has incorporated therein methoxymethylphenyl ether in the amount from about 0.1 to about 10 parts by weight methoxymethylphenyl ether per 100 parts by weight phenolic resin.

7. A refractory composition according to claim 3, wherein the phenolic resin has incorporated therein methoxymethylphenyl ether in the amount from about 0.1 to about 10 parts by weight methoxymethylphenyl ether per 100 parts by weight phenolic resin.

8. A refractory composition according to claim 4, wherein the phenolic resin has incorporated therein methoxymethylphenyl ether in the amount from about 0.1 to about 10 parts by weight methoxymethylphenyl ether per 100 parts by weight phenolic resin.

9. A refractory composition according to claim 1, wherein the compound having a pKa lower than 9.5 at 25° C. is an acid selected from organic acids and inorganic acids, said compound is present in a proportion of about 2 to about 230 parts by weight, and said phenolic resin is present in a proportion of about 150 to about 750 parts by weight, based on 5000 parts by weight of basic aggregate.

* * * * *